June 15, 1948.  F. G. KELLY  2,443,252
PRESSURE OPERATED RHEOSTAT
Filed Nov. 2, 1944
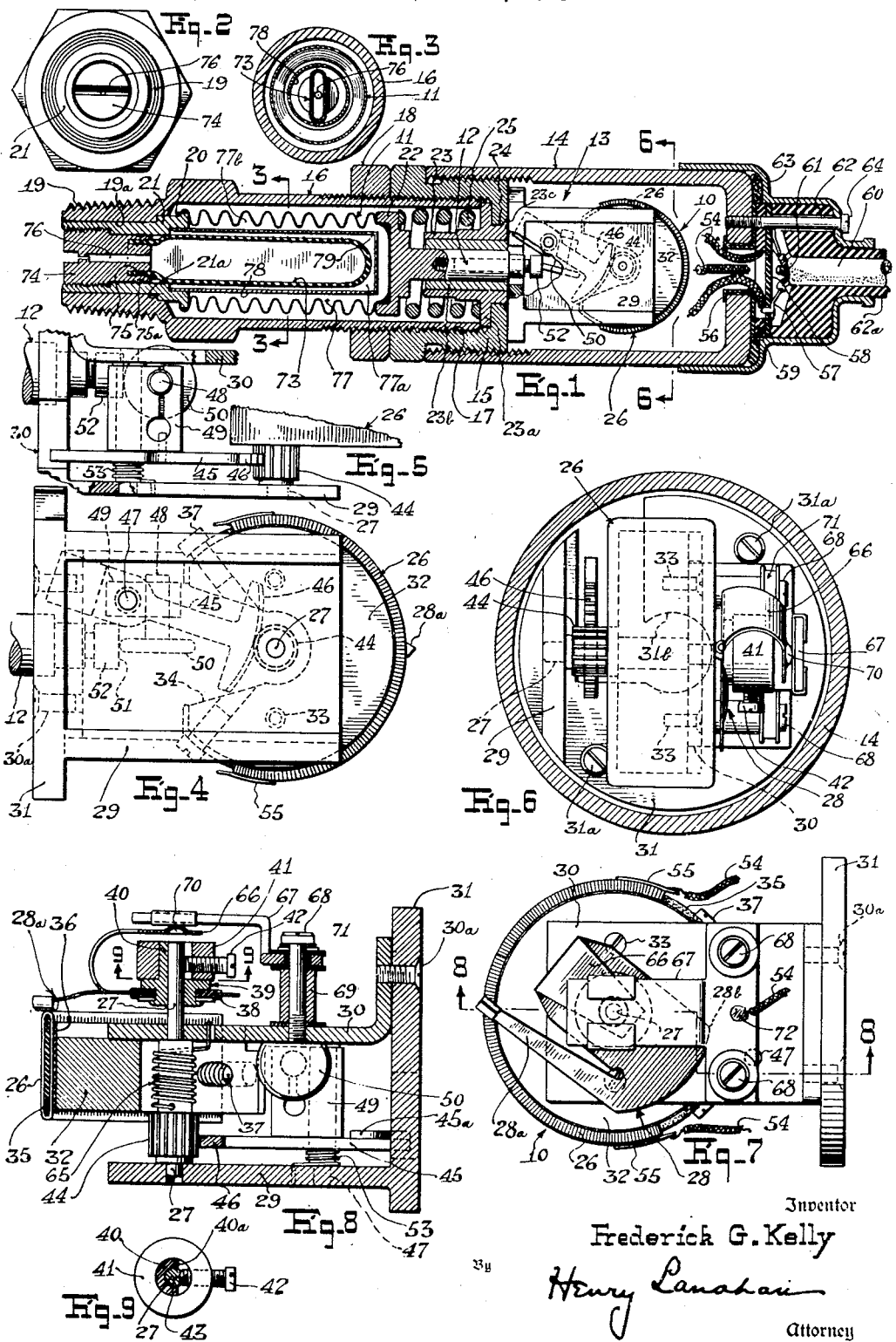
Inventor
Frederick G. Kelly
Henry Lanahan
Attorney Patented June 15, 1948

2,443,252

UNITED STATES PATENT OFFICE 2,443,252

PRESSURE OPERATED RHEOSTAT

Frederick G. Kelly, West Orange, N. J., assignor to Thomas A. Edison, Incorporated, West Orange, N. J., a corporation of New Jersey Application November 2, 1944, Serial No. 561,623

11 Claims. (Cl. 201—48)

This invention relates especially to instruments which are responsive to fluid pressure, and more particularly to pressure-actuated variable resistance devices.

The present invention is intended for use in remote pressure-indicating systems, and has been especially adapted for use on aircraft.

It is an object to provide an instrument of the character mentioned which is sufficiently rugged to permit it to be mounted directly on an aircraft engine.

More particularly, it is an object to provide a highly dependable pressure-responsive resistance device which is capable of withstanding heavy vibration and extremes in temperature without substantial impairment in life or operation.

It is a further object to provide novel means for damping pressure-actuated instruments from mechanical vibration and from fluctuations in applied pressure, and it is a further object to provide effective and compact means for so damping a pressure-responsive bellows.

It is another object to provide a rugged vibration-proof motion-amplifying mechanism for coupling a pressure-responsive means to the movable contact of a rheostat.

It is another object to provide an improved condition-responsive instrument which can be adjusted finely for calibration purposes, and it is a further object to provide an adjustable motion-amplifying mechanism of improved character for such an instrument.

A further object is to provide an improved pressure-actuated variable resistance device for the purposes set forth.

Other objects of my invention lie in the combination of parts herein shown, and will be apparent from the following description and the appended claims.

In the description of my invention reference is had to the accompanying drawings of which:

Figure 1 is a view of a resistance device according to my invention, taken principally on a section line through the longitudinal axis of the device and with certain parts broken away to better illustrate certain parts of the device;

Figure 2 is an axial view of the end portion of the device of Figure 1;

Figure 3 is a sectional view taken on the line 3—3 of Figure 1;

Figure 4 is a fractional view of a portion of the device as it appears in Figure 1 but shown to enlarged scale;

Figure 5 is a fractional top side view of the mechanism of Figure 4;

Figure 6 is an enlarged sectional view taken on the line 6—6 of Figure 1;

Figure 7 is a fractional right-hand elevational view of the mechanism of Figure 6;

Figure 8 is a sectional view taken on the line 8—8 of Figure 7;

Figure 9 is a sectional view taken on the line 9—9 of Figure 8.

The principal components of the pressure-responsive resistance device shown in Figure 1 comprise a rheostat 10; a pressure-responsive actuating means for the rheostat shown, in its preferred form, as a bellows 11; a plunger 12 actuated by the bellows; and a motion-amplifying mechanism coupling the plunger to the rheostat and generally referred to as 13.

The housing for this resistance device is a rigid cylindrical structure comprising a cup-shaped housing member 14 in which is disposed the rheostat and motion-amplifying mechanism; a screw plug 15 which is threaded interiorly into the open end portion of the housing member 14; and a casing 16 of suitably lesser diameter than the housing member 14 which houses the bellows 11 and which is threaded into a bore 17 of the plug 15, the casing being locked to the plug 15 by a lock nut 18 which is tightened against the base of the plug. On the outer end of the casing there is an exteriorly-threaded nipple 19 for pipe connection of the casing to a source of pressure to be measured.

The bellows 11 is sealed fluid-tight at 20 to the inner end of a sleeve 21 which fits the bore 19a of the nipple 19, the sleeve having a peripheral shoulder 21a which seats in an inner end portion of this bore to hold the sleeve against outward movement from the casing. Engaging a closed inner end of the bellows is a cap 22 provided on an end of the plunger 12. The plunger is slidably mounted in a bearing 23b which is carried in a sleeve member 23 that engages a reduced-diameter bore 24 at the end of the plug 15. This sleeve member has a peripheral flange 23a which is held firmly against the inner end of the bore 17 by riveting of the sleeve member to the plug as at 23c. Interposed between the cap 22 and the flange 23a is a compression spring 25 which urges the bellows 11 into a contracted condition. When fluid under pressure is introduced through the nipple 19 into and out of the bellows, the bellows is expanded and contracted lengthwise according to the pressure of that fluid and the plunger 12 is moved back and forth along the longitudinal axis of the housing. By this movement of the plunger the rheostat 10 is operated as is hereinafter explained.

Preferably, there is employed a rheostat of the rotary contact type as shown. This rheostat comprises a single-layer winding 26 of "Nichrome" wire having its longitudinal axis curved on an arc through the major part of a circle, a central shaft 27 and a spring contact member 28 carried by the shaft 27 and having an arm 28a slidably contacting the winding 26. The rheostat is mounted with its shaft 27 transverse to the longitudinal axis of the housing and in the plane of the axis of the plunger 12. This is journalled in two standards 29 and 30, of which the standard 29 is integral with a base 31 that is held by screws 31a to the end of the plug 15 and the standard 30 is held by screws 30a to this base. As shown in Figure 6, the base 31 is circular and is cut away at 31b to clear the plunger 12 and other mechanism as will hereinafter appear. The winding 26 is carried by a metal block 32 which is held by screws 33 against the inner side wall of the standard 30. The block 32 is principally circular, having only a substantially sector-shaped recess 34 for clearing the shaft 27 as shown in Figure 4. The winding 26 is provided with a flat insulating core 35 and is applied, through an intervening insulating strip 36, to the arcuate periphery of the block 32, the projecting end portions of the core 35 being secured by screws 37 to the block for holding the winding in place.

The spring contact member 28—which may generally be referred to as the indicating means of the instrument—is held in an insulating bushing 38 that is staked to a flanged collar 39. This collar is mounted on the end portion of the shaft 27 which extends beyond the standard 30 as shown in Figure 8. For holding the contact member tightly to the shaft in adjustable angular positions relative thereto, the collar 39 has a reduced-diameter sleeve portion 40 which is provided with a segmental recess 40a as shown in Figure 9, and this outer end portion 40 is embraced by a clamping ring 41 that is held by a set screw 42 to the shaft 27, the set screw passing radially with respect to the shaft through the recess 40a and engaging a flat 43 on the shaft. When the set screw is just slightly loosened from the shaft, the clamping ring is released from the sleeve 40 and the contact member is free to be adjusted relative to the shaft, it being understood that the clamping ring will be retained in its angular position relative to the shaft as the contact member is so adjusted because of the engagement of the set screw with the flat 43. The range of angular adjustment of the contact member 28 is determined by the angular width of the recess 40A, this width being suitably just slightly less than 180° as shown in Figure 9. Into whatever position the contact member is so adjusted within this range, it is locked to the shaft by tightening the set screw 42 of the clamping ring. The advantage in this particular means for adjustably locking the contact member to the shaft 27 is that the contact member can be adjusted repeatedly without marring any parts that will reduce the accuracy of adjustment since the set screw engages the same point on the shaft 27 for each adjustment; also, since the set screw is on a radius line, there is no tendency for the clamping ring or contact member to be displaced by force exerted against the set screw in tightening it against the shaft.

The motion-amplifying mechanism 13 aforementioned comprises a pinion 44 secured to the shaft 27 at a point thereon between the standards 29 and 30 and a lever 45 having a gear segment 46 meshing with that pinion. The lever 45 lies adjacent the standard 29 and is secured to a shaft 47 which has reduced-diameter ends pivoted to the standards 29 and 30, the pivot axis of the lever being transverse to the path of movement of the plunger 12 and offset therefrom as shown in Figure 4. The lever 45 has a side arm extending transversely to the plunger 12, which consists of a screw 48. This screw—wherein is hereinafter referred to as an "arm-screw"—is threaded into a block 49 (see Figures 4 and 5) that is held to the shaft 47 in fixed relation to the lever, the block being split as shown in Figure 5 so as to clamp the threads of the arm screw and hold it tightly in place. On the end of the arm screw there is a circular concentric head 50 the peripheral edge of which confronts a flat smooth-surfaced end face 51 on the head of a screw 52 that is threaded axially into the plunger. By means of a torsional spring 65, which angularly biases the shaft 27, the peripheral edge of the head of the arm screw 48 is maintained continuously in contact with the face 51.

It will be understood that in view of the lever 45 being pivoted on a fixed axis at the side of the end face 51 of the plunger 12, the leverage of the arm screw 48 is varied as the screw is threaded inwardly and outwardly with respect to the block 49. For example, when the arm screw contacts the central portion of the face 51 as shown in Figure 4, a given displacement of the plunger 12 will turn the lever 45 a given amount, and when the arm screw is adjusted to shorter and longer lengths the same displacement of the plunger will produce respectively greater and lesser angular displacements of the lever 45. Similarly, from a dynamic standpoint, when the arm screw is adjusted to shorter and longer lengths the rate of movement of the lever 45 for a given rate of movement of the plunger is respectively increased and decreased. The action of the arm screw 48 is thus to control the rate or sensitivity of response of the instrument.

In calibrating the instrument several different adjustments are made. For example, not only is the arm screw 48 adjusted to set the rate of response as aforementioned, but also the contact member 28 is adjusted relative to the shaft 27, by the means hereinbefore described, to set the instrument to zero, it being understood that this setting is carried out by adjusting the arm 28a along the winding 26 to a zero- or predetermined reference-indicating pressure while the bellows 11 is subjected to a zero or reference pressure.

In addition to the foregoing adjustments there is required an adjustment of predeterminately setting the effective angle between the plunger 12 and lever 45 for a given state of actuation of the bellows 11, this angle being that between the direction of movement of the plunger and a line running through the pivot axis of the lever 45 and the point of contact of the arm screw 48 with the end face 51 of the plunger. This angle is of importance because it varies as the plunger moves and has the effect of giving a non-linear response to the instrument to the extent of the variation of the cosine of the angle. In a limited range of movement of the lever 45 from a position of the lever wherein this angle is 90°—this position being herein termed the "mid-range position" of the lever—the movement-transmitting ratio between the plunger 12 and lever 45 is substantially constant. It is therefore desired that the working range of the lever 45 shall extend clockwise and counterclockwise from this mid-range position by equal amounts so that the contact arm 28a shall be moved substantially linearly with the pressure applied to the bellows 11. With different instruments, this angle will be different for a given pressure applied to each instrument because of manufacturing variations in the components of the instruments. To compensate for these manufacturing variations, this angle is predeterminately set for a given pressure applied to each instrument by adjusting the screw 52 relative to the plunger 12 and by correspondingly adjusting the contact arm 28a relative to the shaft 27 to set the arm to a predetermined position with respect to the winding 26.

The operation of the mechanism herein so far described is as follows: As the pressure is increased within the bellows 11 the plunger 12 is moved along the axis of the instrument and, through contact of the end face 51 with the head 50 of the arm screw 48, the lever 45 is turned in a counterclockwise direction as seen in Figure 4, the maximum range of motion of the lever being of the order of 35°. This motion of the lever is amplified many times by the gear 46 and pinion 44, and transmitted by shaft 27 to the contact member to cause the arm 28a to slide along the winding 26 through a maximum angular range of the order of 180°. As a result a varying resistance is produced between the ends of the winding 26 and the contact arm 28a in accordance with the rise of pressure within the bellows. As the pressure in the bellows is reduced, the reverse movements take place: the plunger being returned by the spring 25 and the contact arm 28a being correspondingly returned along the winding 26 by the spring 65. By appropriate electrical connection of the rheostat 10 to a suitable remote indicating instrument, not shown, the resistance variations of the rheostat are translated into pressure indications at a remote point.

For making electrical connection from a remote point to the rheostat 10, lead wires 54 are connected to lugs 55 at the ends of the winding 26 and to the contact arm 28a—the connection to this arm being in the manner hereinafter explained—and are brought out through an insulating grommet 56 in the end wall of the housing member 14. The lead wires connect respectively to terminals 57 carried by an insulating plate 58, this plate being spaced from the end of the housing member 14 by insulation 59. At the outer side of this plate there is a cable 60 having lead wires 61 connecting respectively to the terminals 57. Secured to the end portion of the cable is an annular body 62 of rubber. This body is surrounded by a metal shell 63 which fits the housing member 14 and is held thereto by screws 64.

In general, instruments which are to be used on aircraft have to be able to withstand heavy vibration and extremes of temperature. The present instrument is adapted to withstand not merely the vibration and temperature extremes ordinarily required in aircraft use, but a yet more rigid and severe degree of vibration and temperature variation so that the instrument may be mounted directly on the engine. A typical application for such instrument is for measuring engine oil pressure. Important advantages in directly mounting a pressure-responsive resistance device of a remote pressure-indicating system on the engine is that no oil line (capillary tubing) is required—the usual long length of oil line between the engine and the remote indicating instrument being here replaced by wiring—the rate of response of the indicating instrument to changes in pressure at the engine is greatly increased because the delay inherent in a long length of capillary tubing is here avoided, the weight of the measuring system is materially reduced, and dependable operation is assured during flying in arctic climates or in the stratosphere because there is no oil line to freeze or congeal.

In proofing the instrument against temperature, it is found to be important that the spring 25 have an essentially zero temperature coefficient of expansion. A satisfactory material for this spring is one made of that known commercially as "Elinvar." Since the bellows 11 is a relatively flexible component in the system, it need not be made of any special material having a low temperature coefficient of expansion. In the coupling mechanism 13 it is important that none of the elements shall "freeze" in position at one temperature extreme nor that they shall have inordinate play at the other temperature extreme. Important in this respect is the elimination of as many positive connections between the elements as possible. To this end the biased contact of the arm screw 48 with the head of the plunger 12 is helpful.

To meet the rigid requirements with respect to vibration, it has been necessary to employ a number of expedients. First, it may be noted—but without respect to relative importance—that in order to anchor positively the cable 60 to the housing, it is highly important that the rubber head 62 be made integral with the sheath 62a of the cable. In the instrument proper, it is important that the plunger 12 have not less than a predetermined minimum area of sliding contact with the sleeve 23 and that the sleeve shall have a hard and entirely friction-free bearing 23b for supporting the plunger. To this end the plunger is provided with a diameter at least of the order of .175" and the bearing 23b is made of "Oilite" bronze, or equivalent material. Also, in order to maintain a continuous contact between the contact arm 28a and the resistance winding 26, it is found necessary that the arm have a small effective mass and a high degree of stiffness so that it shall not break contact with the winding at less than a peak vibration acceleration of 175 times gravity.

Moreover, it is essential that all rotary elements of the coupling mechanism shall be suitably balanced. To this end, the contact member 28 is provided with an integral extending portion 28b (see Figure 7) which is opposite the contact arm 28a and the spring arm 66 hereinafter described, and the lever 45 is provided with a counterweight 45a as shown in Figure 8.

In addition to the foregoing, it is essential that the shafts 47 and 27 be biased longitudinally so that they will not vibrate longitudinally to cause excessive wear between the gear segment 46 and the pinion 44 or to cause the contact arm 28 to break contact with the winding 26. The longitudinal biasing of shaft 47 is effected by a compression spring 53 which surrounds the shaft and is interposed between lever 45 and standard 29 as shown in Figure 8. The longitudinal biasing of the shaft 27 is provided by action of the spring arm 66, which is integral with the contact member 28, against a stop arm 67 held by screws 68 through spacers 69 to the standard 30. The spring arm 66 is bent in a substantially half circle and has a contact button 70 at its end portion which bears against the stop arm 67 at a point axially in line with the shaft 27, the advantage in obtaining the biasing of the shaft from a point axially in line therewith being to eliminate friction.

A further important feature in rendering the present instrument insensitive to mechanical vibration lies in the provision of novel and effective means for damping the bellows 11. This damping means is of a closed liquid-filled type, and is novelly associated with the bellows by being disposed therewithin, the advantage in this association being to reduce the over-all size of the instrument. The damping means comprises an expansible bulb 73 of a material such as synthetic rubber, which is mounted onto a screw plug 74 that threads into the outer end portion of the aforementioned sleeve 21. When this bulb is in an unexpanded state it has an oblong shape in cross section as shown in Figure 3. The open end or neck portion of the bulb is circular in transverse section and fitted into an annular groove 75 provided by the end wall of the plug 74, and the outer wall of this groove is spun radially inwardly, at a short distance back from the end of the plug, to form an annular constriction 75a for tightly embracing the neck of the bulb and securely sealing the plug to the bulb. In the plug there is an axial passageway 76 for transmitting fluid pressure to be measured—typically the oil pressure of an aircraft engine—into the bulb.

The bulb 73 and bellows 11 enclose a liquid-tight chamber 77. This chamber is divided into two compartments 77a and 77b by a partition which is in the form of a rigidly-walled closed-ended tube 78, this tube being interposed between and spaced from the bulb and bellows and being sealed at its base to the inner portion of the sleeve 21 as shown in Figure 1. The tube 78 has a restricted opening 79 which may for example be a saw cut at a corner portion of the tube of say .005″ width and .010″ length. The chamber 77 is completely filled with a pressure-transmitting and damping fluid that will maintain a liquid state and have negligible variation in viscosity through the temperature range to which the instrument is exposed. In aircraft applications, this temperature range is very wide, being from −55° C. to +100° C. I find however that the synthetic liquids known commercially as "Silicones" fulfill these requirements very well.

The damping fluid has a thermal volumetric change of approximately 25% within the temperature range from −55° C. to +100° C. The volumetric variation of the bulb 73, between its flattened shape shown in Figure 3 and a nearly cylindrical shape, is however greater than the sum of the thermal volumetric change of the damping fluid and the displacement volume of the bellows 11 between contracted and expanded conditions. Thus, by filling the compartments 77a and 77b with a proper amount of damping fluid, the bulb will have a flattened partially collapsed shape shown in Figure 3 at the highest operating temperature and with the bellows 11 contracted, and will take a substantially cylindrical shape but be not stretched at the lowest operating temperature and with the bellows 11 expanded. The only pressure consumed by the bulb in changing between its flattened and cylindrical shapes is that required to flex the walls of the bulb, which is a negligible pressure of only approximately .25 lb. per sq. in. Accordingly, the bulb has no substantial effect on the sensitivity or calibration of the instrument.

The damping action of the system just above described depends upon the incompressibility of the liquid which fills the chamber 77 and the restricted rate with which the liquid can flow through the opening 79 between compartments 77a and 77b of this chamber. For example, when the pressure-responsive device is subjected to vibration the bellows 11, having resilience and mass, will in the absence of damping respond to that vibration and cause the contact arm 28a to vibrate, the response of the bellows being particularly great when the frequency of the forced vibrations approaches a natural or resonant frequency of the bellows system. With the present damping system, however, the bellows can respond only as much as it is permitted to by flow of liquid into and out of compartment 77b through the restricted opening 79. The frequency of vibration to which the instrument is subjected is, for aircraft applications, typically at least as high as 45 C. P. S. with many harmonics of the vibration being at frequencies much higher than this. At frequencies of 45 C. P. S. or more, the resistance of the restricted opening is high and the damping of the bellows is accordingly very effective. This damping is likewise effective as to rapid fluctuations in applied fluid pressure to the instrument for as the fluid pressure fluctuates the restricted flow rate of the opening 79 will effectively prevent transmission of those fluctuations to the bellows 11. The normal variations in fluid pressure which are to be measured are, however, relatively slow, being typically of the order of 1 C. P. S. or less. The restricted opening 79 passes liquid at a sufficiently fast rate to enable these normal pressure variations to be transmitted to the bellows 11 without appreciable lag. Accordingly, the bulb 73 will undergo volumetric variations in response to the normal pressure variations, as will also the bellows 11, with the result that the rheostat 10 is varied in resistance in accordance with the normal pressure variations.

The electrical connection of the lead wire 54 to the contact arm 28a hereinbefore mentioned is made conveniently through the stop arm 67 and spring arm 66. Accordingly, the arm 67 is insulated from the screws 68 and spacers 69 by insulating bushings and washers generally referred to as 71, and one of the lead wires 54 is soldered to the member 67 as at a point 72 shown in Figure 7.

The embodiment herein particularly shown and described is intended to be illustrative and not limitative of my invention, since the same is subject to many changes and modifications without departure from the scope of my invention, which I endeavor to express according to the following claims.

I claim:

1. A closed pressure-transmitting system for operation within predetermined pressure and temperature ranges comprising a pressure-actuatable member, a flexible bulb connected to said member to form a closed space, said space containing a pressure-transmitting fluid characterized as having a thermal coefficient of expansion, means for applying pressure to said bulb to actuate said member, said bulb being in its state of maximum collapse when said applied pressure is at one extreme and the temperature of said fluid is at the opposite extreme of their respective ranges, and the volumetric displacement of said bulb between said condition of maximum collapse and a totally uncollapsed condition being equal at least to the sum of the thermal volumetric change of said fluid through said temperature range and of the volumetric displacement of said actuatable member through the range of said applied pressure.

2. In a pressure-actuated variable resistance device including pressure-responsive means: the combination of an element actuated by said pressure-responsive means along a predetermined path; a rheostat having a movable contact member; a pivoted lever coupled to said contact member; an arm associated with said lever and contacting said actuated element at a point offset from said pivot axis in directions transverse to said path; and means for adjusting the effective length of said arm with respect to said lever whereby the rate of turning of said contact member is controlled for a given rate of movement of said actuated element.

3. A pressure-actuated variable resistance device comprising a rectilinearly-movable pressure-responsive member; a rheostat having a shaft and a contact member pivotally carried thereby; a pivoted lever coupled to said shaft; an arm associated with said lever; and a head on said pressure-responsive member for contacting said arm and turning the same in response to rectilinear movement of the member, said contact member being angularly adjustable on said shaft and said head being rectilinearly adjustable with respect to said pressure-responsive member whereby the angle between said arm and the direction of movement of said pressure-responsive member can be set to a predetermined value for any given position of said contact member.

4. In an instrument including operable means and actuating means therefor: a motion-transmitting mechanism intercoupling said actuating and operable means and comprising independent members coupled to said actuating and operable means respectively, said members being biased into contact with one another; means pivotally holding one of said members on a predetermined axis; and means holding the other of said members for movement in a path transverse to said axis and offset therefrom, one of said members being mounted for adjustment along said path relative to its mounting means whereby the angle between said path and the line passing through said axis and the point of contact between said members is predeterminately established for a given position of said actuating means.

5. In a pressure-actuated variable resistance device including pressure-responsive means: the combination of an element actuated by said pressure-responsive means and having a smooth driving face; a rheostat having a shaft and a contact member carried pivotally thereby; and means for coupling said contact member to said actuated element including a lever drivingly connected to said contact member and having its pivot axis offset laterally from the path of said actuated element, a screw-threaded member associated with said lever and having a concentric circular head the peripheral edge of which is adapted to contact said face, said screw-threaded member being adjustable relative to said lever along said face; and means biasing said lever to maintain said screw-threaded member in contact with said face.

6. In an instrument including operable means and actuating means therefor: a motion-amplifying mechanism for coupling said operable means to said actuating means, said mechanism including a member pivoted on a predetermined axis and operating said operable means as the member is turned, a member coupled to said actuating means and actuated thereby, and an adjustable coupling between said members comprising a smooth-surfaced face on one of said members and moved thereby in transverse relation to said axis and in a path spaced therefrom, and a screw-threaded element secured to the other of said members and having its longitudinal axis in transverse relation to said path, said element having a concentric circular head whose peripheral edge is held in contact with said face, and said element being threadingly supported whereby with turning of the element the distance is varied between said pivot axis and the point of contact of the peripheral edge of the element with said face.

7. In an instrument including operable means and actuating means therefor: an adjustable mechanism for coupling said operable means to said actuating means, including a member pivoted on a predetermined axis and causing said operable means to be operated as the member is turned, a member coupled to said actuating means and moved thereby, a first screw-threaded element secured to one of said members and having an end face at right angles to the direction of movement of the element, and a second screw-threaded element secured to the other of said members and disposed in transverse relation to the path of said first screw-threaded element having a circular concentric head the peripheral edge of which confronts said face, and means biasing one of said members whereby the peripheral edge of said head is maintained in contact with said face.

8. A pressure-actuated variable resistance device adapted for direct mounting on an aircraft engine, comprising a pressure-responsive member; a rheostat having a balanced contact member pivoted on an axis at right angles to the direction of movement of said member; a pinion connected to said contact member; a balanced gear member meshing with said pinion; lever means coupling said pressure-responsive member to said gear member; and means for holding said contact member and gear member constrained against axial play.

9. A pressure-actuated variable resistance device adapted for direct mounting on an airplane engine and to withstand the normal engine vibration, comprising a pressure-responsive means, a rheostat including a resistance element and a relatively-movable contact arm associated therewith, and balanced rotary means for coupling said contact arm to said pressure-responsive means, said contact arm being biased into engagement with said resistance element and having an effective mass and stiffness adapted to prevent the arm from being flexed out of contact with said resistance element when said device is vibrated.

10. In an instrument of the character described: the combination of a rheostat including a journalled shaft and a contact member carried by said shaft; means for turning said shaft; and means for holding said shaft constrained against longitudinal play comprising a stationary stop member and a spring member carried by said shaft and pivotally contacting said stop member at a point axially in line with said shaft.

11. The subject matter set forth in claim 10, including electrical circuit means for making electrical connection to said movable contact member, said circuit means comprising said spring and stop members.

FREDERICK G. KELLY.

REFERENCES CITED

The following references are of record in the file of this patent:

UNITED STATES PATENTS

| Number | Name | Date |
|---|---|---|
| 242,297 | Garsed | May 31, 1881 |
| 897,730 | Fulton | Sept. 1, 1908 |
| 1,025,986 | Lester | May 14, 1912 |
| 1,921,550 | Swallen | Aug. 8, 1933 |
| 2,099,915 | Weatherhead | Nov. 23, 1937 |
| 2,117,800 | Harrison | May 17, 1938 |
| 2,226,441 | Paul | Dec. 24, 1940 |
| 2,248,047 | Addy et al. | July 8, 1941 |
| 2,283,378 | Liner | May 19, 1942 |
| 2,297,678 | Allen | Oct. 6, 1942 |

FOREIGN PATENTS

| Number | Country | Date |
|---|---|---|
| 608,724 | Germany | 1935 |

Certificate of Correction

Patent No. 2,443,252. June 15, 1948.

FREDERICK G. KELLY

It is hereby certified that error appears in the printed specification of the above numbered patent requiring correction as follows:

Column 10, line 35, claim 7, after the word "element" insert the comma and words *, said second screw-threaded element*;
and that the said Letters Patent should be read with this correction therein that the same may conform to the record of the case in the Patent Office.

Signed and sealed this 9th day of August, A. D. 1949.

[SEAL]

THOMAS F. MURPHY,
*Assistant Commissioner of Patents.*